United States Patent Office 3,692,597
Patented Sept. 19, 1972

3,692,597
POLYURETHANE PROPELLANT COMPOSITIONS
AND THEIR PREPARATION
Charles E. Brockway, Akron, Charles S. Schollenberger, Cuyahoga Falls, and Eugene F. Sachara, Cleveland, Ohio, assignors to The B. F. Goodrich Company, New York, N.Y.
No Drawing. Filed June 29, 1955, Ser. No. 518,985
Int. Cl. C06d 5/06
U.S. Cl. 149—19
24 Claims The present invention relates to gas generators. In particular, this invention relates to a novel solid composition of matter which is combustible to rapidly produce a large volume of gas for driving various devices, for atomizing sprays and the like, to a novel method of making said composition and to a novel article of manufacture including said composition.

Conventional heterogeneous solid gas-generating compositions for producing large volumes of gas for spraying equipment, for propelling various devices, for pyrotechnic devices, and the like have required elevated curing temperatures for extended periods of time in order to obtain compositions which have minimum physical properties. Moreover, if the binder content of the compositions is increased to improve the physical properties, their burning rate is markedly reduced and smoky burning generally results from incomplete combustion. Furthermore, even the best of the prior art compositions are unstable with respect to physical properties and burning characteristics during storage for extended periods, particularly in air at temperatures of from 70° to 150° F. They may decompose slowly to produce decomposition products which attack the igniter material or require use in a sealed container and special atmospheres. Accordingly, it is a primary object of the present invention to provide a composition of matter which overcomes the difficulties alluded to in the prior art and which is strong, is characterized by high burning rates, is nonsmoky and is chemically stable during storage at elevated temperature.

Another object is to provide a solid composition of matter having satisfactory elongation, high tensile strength, good impact resistance, good againg stability, and which exhibits a high rate of combustion when ignited.

Still another object is to provide an article of manufacture comprising a solid gas-generating composition which exhibits high tensile strength, high impact resistance, satisfactory elongation, and good chemical stability over an extended useful temperature range.

A further object is to provide an article of manufacture containing a shaped and cured composition which will burn to liberate large volumes of gas of low molecular weight, which exhibits good linear burning rates over a wide range of pressure and ambient temperature, and which has long storage life.

A still further object is to provide a method for rapidly, economically and safely producing a solid gas-generating composition exhibiting excellent physical and chemical properties.

Yet again an object of this invention is to provide a method for producing a gas-generating composition at relatively low processing and curing temperatures.

These and other objects and advantages of the present invention will become more apparent to those skilled in the art from the following detailed description and examples.

According to the present invention it has now been found that a highly useful heterogeneous solid gas-generating composition can be obtained by mixing a minor amount of a polymer, formed by the reaction of an organic diisocyanate with a hydroxyl terminated polyester reaction product of a dibasic acid and a glycol and cured by means of a polyfunctional hydroxyl or polyhydroxy curing agent, with a major amount of a finely-divided oxidizing agent combustible to yield oxygen in a form available for oxidizing or burning the polymer. The compositions disclosed herein can readily be mixed, shaped and cured in a relatively short period of time at low temperatures even as low as room temperature. The freshly mixed compositions are sufficiently plastic to be molded and extruded to the desired shapes. The cured compositions are chemically stable in the atmosphere over a temperature range of —65 to +175° F., are strong, and shock resistant. On combustion, the compositions are nonsmoky and exhibit good linear burning rates to produce large quantities of low molecular weight gaseous products.

The oxidizing agent used in the composition of the present invention is a material, generally an inorganic salt, which readily decomposes on ignition to liberate gases which contain excess oxygen in the form of $O_2$ or in some other form which is available for combusting the organic, plastic, rubbery binder. Preferably, the oxidizing agent should combust entirely into gaseous products or into predominantly gaseous products containing only minute amounts of finely-divided solid or liquid particles. Moreover, the chemical constitution of the oxidizing agent should be such that the total weight of the gases produced on decomposition is low in relation to the mols of available oxygen produced. The oxidizing agent should also be chemically and physically stable at temperatures of from about —65 to +175° F. so that it does not decompose in the cured composition nor melt to distort the cured composition. Furthermore, the oxidizing agent should be capable of being compounded readily into the gas-generating composition. The oxidizing agents found most useful in practice of the present invention are the inorganic decomposable alkali salts having excess oxygen available such as ammonium nitrate, ammonium perchlorate, potassium nitrate, potassium perchlorate, sodium nitrate and sodium perchlorate or mixtures thereof. Ammonium perchlorate is generally preferred since it readily combusts to entirely gaseous products of low molecular weight and has greater oxidizing capacity per given weight of material. While oxidizing agents such as ammonium periodate, sodium iodate and the like can be employed, they are not preferred since for a given weight of the oxidizing material, the mols of oxygen available on decomposition are not as great as in the case of the earlier mentioned oxidizing materials and the mols of gases produced such as HI, etc., have a correspondingly greater molecular weight. Thus, when using the latter materials as oxidizing agents, the proportion of material used must be greater than that required with the perchlorates to effect the same degree of combustion. Moreover, as a consequence, the use of larger amounts of such oxidizing agents results in a composition having less desirable physical properties.

Prior to mixing with the polymeric binder, the oxidizing agent should be in a finely-divided form, preferably obtained by grinding, to obtain best distribution throughout the polymer and to obtain the highest burning rate. Moreover it is preferred to remove water vapor from the oxidizer by drying before use to obtain best disintegration during grinding, best dispersion in the binder, and good combustion of the composition.

The total amount of oxidizing agent employed in the composition should be sufficient to accomplish rapid combustion of the polymeric binder-fuel and other organic additives to substantially gaseous products of low molecular weights. The oxidizing agent should burn or oxidize the binder preferably entirely to CO and $H_2O$ and even more preferably to $CO_2$ and $H_2O$ including nitrogen containing gases while producing large volumes of the same or other gases to obtain the greatest pressures. On the other hand the polymer binder is used in a relatively minor amount as deemed necessary to provide the composition with the requisite processability and physical properties. In general, therefore, the oxidizing agent will be present in a major amount and the binder will be present in a minor amount. Preferred compositions prepared according to the method of the present invention will contain from about 70 to 87% by weight of the oxidizing agent with the balance being the binder except for minor amounts of other compounding ingredients such as burning rate modifiers, retarders, etc. It, of course, will be appreciated that where lower burning rates are desired, or where unreacted particles from the binder are not objectionable, larger amounts of binder can be used which will afford even better physical properties to the composition herein disclosed. On the other hand, larger amounts of oxidizing agent can be employed in the composition when higher burning rates are desired and lowered physical properties of the cured composition are not objectionable.

The binder employed in the composition of the present invention should be a material which is readily combustible on ignition to yield CO, $CO_2$, $H_2O$, $H_2$, $N_2$, and/or oxides of nitrogen. The binder should be cohesive, be capable of being highly loaded with inorganic salt and be processable by mixing, extruding, molding and curing at temperatures appreciably below the autoignition point of the composition. By "temperatures appreciably below the autoignition point of the composition" is meant temperatures at which mixing, extruding, molding and curing can be performed without spontaneous ignition of the composition. Preferably, the processing and curing of the composition is conducted at temperatures not greater than about 100° F. and curing is obtained at temperatures not greater than about 170° F. A feature of the process of the present invention is that cures can be effected in 30 minutes at 165° F. or even at room temperature although about 16 hours may be required in such cases.

Binders which meet the above requirements are polymers formed by the reaction of an organic diisocyanate with a hydroxyl terminated polyester (the reaction product of a dibasic acid and a glycol) which is then cross-linked, cured or vulcanized with a polyfunctional hydroxyl, polyhydroxy, curing agent. Such polymers are capable of being highly loaded to produce compositions which when cured exhibit the desired physical properties. Moreover, they are combustible with oxygen from the oxidizing agent to form substantially all low molecular weight gaseous products. They also are cohesive, easily processed and cured at relatively low temperatures and are chemically and physically stable for long periods at atmospheric temperatures as described supra. One or more of the various polymeric diisocyanate-polyester binders disclosed herein can be used in practice of the present invention.

A method for making the polymeric binder and the types of reactants which can be employed will be described in the following paragraphs. Still other methods can be used.

The polyester is prepared by an esterification condensation reaction of a dibasic (dicarboxylic) acid or an anhydride thereof with a glycol. To obtain a terminal hydroxyl group, a molar excess of the glycol is employed. Molar excesses of the acid are to be avoided since they would form terminal carboxyl groups which are not desired as they generally cause gas release during the subsequent crosslinking reaction.

The dicarboxylic acids used in the esterification reaction include malonic, succinic, glutaric, adipic, pimelic, sebacic, suberic, azelaic, maleic and the like of which adipic acid because of cost and availability is preferred. It is not essential that the acid be used for similar results can be obtained with the corresponding acid anhydride or acid chloride. Dicarboxylic acids containing a nitro group may also be used such as nitro adipic acid, nitro suberic acid, and the like, to oxygen-enrich the polymer. Alicyclic dicarboxylic acids can be used as well as the aliphatic dicarboxylic acids which are preferred. Moreover, mixtures of the acid, anhydride or chloride can be employed.

The glycols utilized in the preparation of the polyester are ethylene glycol, 1,3-butanediol, 1,4-butanediol, pentamethylene glycol, hexamethylene glycol, cyclohexanediol, diethylene glycol, triethylene glycol, 1,2-propanediol, 1,3-propanediol, or 1,2-butanediol, etc. Ethylene glycol is the preferred glycol to employ. Moreover, glycols containing a nitro group such as 2-nitro hexanediol-1,6, 2-nitro octanediol-1,8, and the like, to oxygen-enrich the polymer can be used. Likewise, mixtures of glycols can be employed in the esterification reaction.

To prepare the polyester, the dibasic acid and glycol are reacted together at elevated temperature and reduced pressure to remove substantially all water of esterification and excess reactants. Polyesters of average molecular weights of 600 to 3,000 can easily be obtained. It is preferable to store the resulting polyester under anhydrous conditions until used in subsequent operations to avoid the formation of gas bubbles in the subject composition.

Organic diisocyanates which are usefully reacted with the polyester are aromatic diisocyanates such as naphthylene-1,5-diisocyanate, diphenylmethane-p,p'-diisocyanate, triphenylmethane-p,p'-diisocyanate, meta-tolylene diisocyanate, and the like. Aliphatic diisocyanates such as hexamethylene diisocyanate and the like can also be employed. Phenylene diisocyanates such as p-phenylene diisocyanate, m-phenylene diisocyanate, 4,4'-diisocyanato dibenzyl and other phenylene diisocyanates also can be employed. The diisocyanate can also contain an oxygen-enriching nitro group. Examples of such a compound are 2-nitro-p-phenylene diisocyanate, 5-nitro-m-phenylene diisocyanate and others. Mixtures of the organic diisocyanates can also be used.

The diisocyanate is used in a molar amount greater than, equivalent to or slightly less than the total combined mols of the polyester and of the cross-linking agent. It is to be understood that the cross-linking agent is employed in amounts sufficient to result in a plastic, rubbery, tough, polymeric gum stock when uncompounded or unloaded with the oxidizing agent. Preferably, the amount of diisocyanate will vary from about 1.3 to 2.0 mols per mol of polyester and per 0.2 to 0.8 mol of polyhydroxy cross-linking agent. These amounts, of course, can be varied somewhat to obtain more or less resilient gum stocks.

To prepare the binder the hydroxyl terminated polyester is melted and degassed at reduced pressure and at elevated temperature. The organic diisocyanate is then reacted with the molten polyester with agitation under vacuum at elevated temperature for a short time to form a liquid polyester polyurethane. The product, cooled to room temperature, is then compounded as a liquid in a mixer with the oxidizing agent and other additives, including the cross-linking agent.

The use of cross linking or curing agents with the polyesterdiisocyanate reaction product or polyesterurethane is desirable to prevent crystallization to a brittle material or to prevent tackiness or flowing of the composition when warmed and to permit handling although the polyesterurethane will cure by itself in moist air after an extended period of time. Cross-linking agents are polyfunctional hydroxyl compounds such as ethylene glycol, 1,3-butanediol, 1,4-butanediol, pentamethylene glycol, hexamethylene glycol, cyclohexanediol, diethylene glycol, triethylene glycol, 1,2-propanediol, 1,3-propanediol, 1,2-butanediol, trishydroxy methyl nitromethane and the like. Poly esters of the types hereinbefore mentioned can likewise be used. Triols such as glycerol, 1,1,1-trimethylol propane, trimethylol hexane, monoesters of pentaerythritol and the like are also useful curing agents and are desirable to use when a fast cure is needed. Mixtures of diols and triols can also be used and result in cured binders having a good balance of physical properties. Low molecular weight polyesters with terminal hydroxyl groups prepared from a dibasic acid, glycol and a triol are particularly useful. Other polyfunctional hydroxyl compounds such as ethanolamine, diethanolamine and the like are also effective curing agents. While ethanolamine may cause gelation of the mixture it can be employed in small amounts or it can be employed with glycerol or ethylene glycol to effect a tight rapid cure. Of the various curing agents that can be employed the aliphatic glycols are preferred since they permit easier handling before curing. While the actual curing mechanism of the polyesterurethane, the polyester-organic diisocyanate reaction product, is not precisely known, it would appear that the polyfunctional hydroxyl compound is necessary to obtain plastic, rubbery, tough cures or vulcanizates of the polyesterurethane, and accordingly, for the purposes of this invention it will be termed a curing agent.

It has been found desirable to incorporate in the composition a very minor amount of at least one burning rate catalyst or modifier to enhance its linear burning rate. This material has a high surface area or is of fine particle size and should be refractory in character or heat resistant. While amounts as low as 0.1% by weight of the burning rate modifier on the weight of the composition show some improvement, it is preferred to employ about 1 to 2% by weight of said modifier in the composition to obtain the best linear burning rates at elevated pressure and all conditions of ambient temperature. Higher amounts of the modifier can be used but are not desired since little further improvement is realized and large amounts detract from the physical properties of the composition. Examples of useful burning rate modifiers to employ in the practice of the present invention are copper chromite (a mixture of copper and chromium compounds), zinc chromite, hydrated precipitated calcium silicate, copper hexadecachlorophthalocyanine, red iron oxide, boron, and the like. Moreover, the type of the burning rate modifier used may vary with the concentration of the oxidizing agent. For example, zinc chromite is more beneficial at lower concentrations while phthalo green is more beneficial at higher oxidizer concentrations. The burning rate modifier can be added to the oxidizing agent before or after it is ground or to the mixture of binder and oxidizing agent in the mixing apparatus. However, it is preferred to add the modifier to the oxidizing agent before it is incorporated with the binder to obtain the best dispersion of the material and consistent results.

Very minor amounts of other compounding agents may be incorporated into the composition such as dyes, pigment colors, and the like. Oxygen-rich organic plasticizers such as tetranitromethane, nitroglycerine and the like may also be incorporated into the mixture, in minor amounts, preferably prior to adding the crosslinking agent to reduce the viscosity of the mixture. An organic retarder such as ethyl cyano acetate (about 0.1% by weight of the polyesterurethane) can be added to the polyesterurethane reaction mass to delay crosslinking when the crosslinking agent is mixed with a large mass of the polyesterurethane and oxidizing agent. Tartaric acid which functions as a curing agent but is slower than the triols may also be used as a retarder. On the other hand the composition may be made faster curing by inclusion of a minor amount of a promoter such as a soluble cobalt salt, i.e., cobalt naphthenate, cobalt octoate, cobalt acetyl acetonate, etc.

In preparing the gas-generating composition of the present invention the polyester and the diisocyanate are reacted under vacuum at an elevated temperature with agitation to produce the polyesterurethane. The material is then cooled, preferably to room temperature, and mixed with the required amount of the finely-divided oxidizing agent in a mixer such as a Baker-Perkins Sigma-blade mixer and preferably under reduced pressure. The use of vacuum is preferred since it avoids the possibility of the formation of gas bubbles in the finished product. Mixing is conducted sufficiently long to thoroughly disperse the oxidizing agent through the binder. After the polyurethane and oxidizing agent have been thoroughly intermixed, the crosslinking agent is added, mixing being continued under vacuum with cooling of the apparatus.

The mixed composition can then be removed and sheeted out, extruded, or pressed into the desired shapes for cure. Curing is preferably conducted at temperatures not above about 170° F. for a short period of time while the material is pressed or in a mold to speed production. However, curing can be effected at room temperature in the air after molding but longer times will be required. A feature of the use of the method of the present invention is that mixing, molding and curing can be accomplished at relatively low temperatures, well below the autoignition point of the composition, with obtainment of good physical and chemical properties and under conditions of relative safety in contrast to compositions employing elastomeric polymers of the diene type which require sulfur for cure necessitating higher temperatures for longer periods of time. Another important point is that no noticeable exothermic heat of reaction occurs during the cure.

While mixing is conducted preferably at pressures below atmospheric, it is apparent that mixing can be conducted under atmospheric or higher pressures and some or all of the entrapped gas bubbles that result may be eliminated by molding at high pressures or by subjecting the mixed uncured composition to a degassing step prior to curing or by a combination of the above. Alternatively, if gas bubbles are not objectionable, mixing in air and degassing need not be conducted. Likewise, while the curing agent can conceivably be added to the polyesterurethane at the time the oxidizing agent is mixed with the polyester-urethane, it is preferred to add it last to minimize the extent of curing of the polymer within the mixing apparatus itself. It, of course, is apparent that mixing times and temperatures will vary somewhat depending on the particular materials, their amounts, the type of mixing apparatus used, etc. For example, some rubbery polyesterurethane-containing compositions can be used on a conventional rubber mill. Likewise, pressures and temperatures for molding or extruding will vary. Curing times will be somewhat dependent on the size of the article cured.

While the preferred order of operations in preparing the composition has been described above, it is apparent that other techniques or apparatus can be employed.

The molded or shaped cured composition may then be used as a gas generator but is preferably encased in a suitable container such as a metal tube to protect it and control the flow of gas upon ignition. The composition may be secured to the inside walls of the container by means of an adhesive such as a cement comprising one of the polyurethanes disclosed herein and a curing agent in toluene and the like which is painted on the shaped, cured composition or the walls of the container, or both. The composition can then be inserted in the container to adhere to the same and then can be fitted with conventional igniting apparatus.

It will be appreciated that the polymers mentioned above will produce compositions having some differences in chemical and physical properties which will make them best for certain specific end uses.

The cured compositions of the present invention even though highly loaded with oxidizer exhibit very satisfactory properties as a gas generator. They easily support their own weight, can be handled and used over a wide ambient temperature range of from about $-65$ to $+175°$ F. without deformation and are chemically stable within this temperature range. These compositions exhibit good strength and elongation so that they can withstand considerable shock and high acceleration stresses without damage. They, also, exhibit good linear burning rates.

The "plateau" effect exhibited by some compositions of this invention permits the designer of devices employing the present composition more latitude in construction of the device, such as possibly reducing the weight. They are also readily prepared and cured at relatively low temperatures.

The following examples will serve to illustrate the invention with more particularity to those skilled in the art:

EXAMPLE I

A molar excess of ethylene glycol was reacted with adipic acid in a reactor at a temperature of about 185° C. for about five hours while being agitated. Heating of the mixture was then continued for 8 hours while slowly bubbling nitrogen gas through the mixture so that the acid number of the polyester was reduced to 10. The pressure on the system was reduced to 15–20 mm. Hg to remove gross excess of glycol. Nitrogen was then bubbled through the system with reduced pressure to obtain the desired molecular weight while heating for about 12–16 hours (glycol split out to get the desired molecular weight). At the end of the reaction period the polyester, polyethylene adipate, was removed from the reactor and a portion of it was analyzed and was found to have a molecular weight of about 1,400 and terminal hydroxyl groups. The polyester was then added to p-phenylene diisocyanate in the molar ratio of 1 to 1.7 in a resin kettle and heated to about 265° F. with agitation and while under a vacuum. The polyester-p-phenylene diisocyanate reaction product or polyesterurethane was then cooled to room temperature when, as a liquid, it was charged to a Sigma-blade Baker-Perkins mixer with ammonium perchlorate, in an amount sufficient to provide 80% by weight in the final composition. Prior to mixing the ammonium perchlorate had been dried and one-fourth of it had been ground in a Bantam SH Mikropulverizer at 16,000 r.p.m. using an 0.020" screen. Mixing was conducted under vacuum for 25 minutes, the mixer being cooled to keep the batch temperature at about 77° F. Following initial mixing 1,4-butanediol in the ratio of 0.6 mol of the butanediol to 1.0 mol of the polyester was added to the composition in the mixer and vacuum mixing was continued with cooling for another 10 minutes. The resulting soft "putty" or "dough" at a temperature of approximately 90° F. was then formed to the desired shape in Teflon-coated compression molds under about 500 p.s.i. pressure in a laboratory press and cured at 165° F. for 30 minutes.

Stress-strain determinations run on cured die-cut 0.25 x 2.75" pieces of the composition using a Scott IP4 tester showed that it had an ultimate tensile strength of 721 p.s.i. and an ultimate elongation of 12.2%.

Pieces for strand burning, 6" x 0.1" x ¼", were cut from the cured sheets, edge trimmed, and then inhibited with three dips in a polyvinyl chloride-tricresyl phosphate-tetrahydrofuran solution. Four small holes accurately spaced were then drilled in each strand during support in a jig to accommodate fuse wires for 3-increment burning. The samples for strand burning were then placed in the strand burning bomb and tested. This equipment included a 5,000 lb. working pressure bomb equipped with electrical windings and mechanical refrigeration for temperature control. A back pressure regulator is provided to maintain constant pressure during burning. The bomb contains a quick opening closure head through which pass insulated electrical leads for strand ignition and 3-increment timing and which supports a holder for a single strand and the necessary electrical terminals and is pressurized with nitrogen. A thermocouple in the bomb side-wall measures the ambient temperature of the strand. The bomb is embedded in type metal or other low melting point alloy for measuring ambient temperatures above room temperature. A 5-wire cabled lead connects the bomb with electronic instrumentation for strand firing, increment timing, temperature measurement and control. Results of strand burning tests on the composition showed that it had a linear burning rate of 0.32 in./sec. at an ambient temperature of 70° F. under a nitrogen gas pressure of 350 p.s.i.a. and was nonsmoky.

EXAMPLE II

The method of this example was the same as Example I, above, except that the amount of ammonium perchlorate in the composition was varied. After curing samples were tested and the results are shown below:

| Percent | | Ultimate | | |
|---|---|---|---|---|
| $NH_4ClO_4$ | Polyester-urethanediol polymer [2] | Tensile, p.s.i. | Elongation, percent | Strand burning rate [1] |
| 70.0 | 30.0 | 870 | 52 | 0.30 |
| 75.0 | 25.0 | 630 | 25 | 0.31 |
| 82.5 | 17.5 | 444 | 4.2 | 0.33 |
| 85.0 | 15.0 | 415 | 3.0 | 0.37 |

[1] 70° F., in./sec. at 500 p.s.i.a.
[2] The organic diisocyanate polyester reaction product cured with a diol.

The above results show that satisfactory physical properties can still be obtained in the composition although higher loadings of oxidizing agent are employed. It should be noted that the theoretical amount of $NH_4ClO_4$ in the composition required to burn the polyesterurethane to CO and $H_2O$ is 72.8% by weight and to $CO_2$ and $H_2O$ is 82.9%. Accordingly, the compositions herein disclosed contain sufficient excess oxygen to oxidize essentially all of the binder to gaseous products.

EXAMPLE III

The method of this example was the same as Example I, above, except that the oxidizing agent was varied. After cure, samples of the composition were tested and gave the following results:

| | | Ultimate | | |
|---|---|---|---|---|
| Oxidizing Agent | Percent of oxidizing agent | Tensile, p.s.i. | Elongation, percent | Strand burning Rate [1] |
| $NH_4NO_3$ | 82.5 | 450 | 17 | 0.07 at 2,000 p.s.i.a. |
| $KClO_4$ | 77.0 | 485 | 29 | 0.83 at 1,000 p.s.i.a. |

[1] 70° F., inch/sec.

This example illustrates the fact that other oxidizing agents may be used in the composition of the present invention with achievement of satisfactory results.

EXAMPLE IV

The method of this example was the same as Example I, above, except that the amount of curing agent for the polyesterurethane was varied in the composition and curing was effected at room temperature. The ratio of the mols of polyester, diisocyanate, and curing agent are shown below.

| Material: | Mols |
|---|---|
| Polyester | 1.0. |
| Diisocyanate | 1.7. |
| 1,4-butanediol | 0.2 to less than 0.7. |

The compositions were curable and exhibited satisfactory results. Faster cures occurred when employing the larger amounts of the curing agent. However, cured compositions having satisfactory chemical and physical properties were obtained when the smaller amounts of curing agent were employed although longer curing times were necessary. This example, thus, illustrates the fact that variations in the amounts of curing agent employed can be used with achievement of satisfactory results although for faster production the larger amounts of curing agent are deemed requisite. Moreover, vulcanizates having satisfactory properties can be obtained at room temperature.

EXAMPLE V

The method of this example was the same as Example I, above, except that variations were made in the types of hydroxyl terminated polyesters employed. The polyesters used in place of polyethylene adipate were polyethylene malonate, polyethylene succinate, polybutane sebacate, polypropane maleate, and polypentamethylene glutarate. In each instance, satisfactory strand burning rates and physical properties of the compositions were obtained which were similar to those shown for the composition of Example I. This example thus illustrates the fact that variations can be made in the types of polyesters employed with achievement of satisfactory results.

EXAMPLE VI

The method of this example was the same as Example I, above, except that the p-phenylene diisocyanate was replaced with m-phenylene diisocyanate, tolylene diisocyanate, 4,4'-diisocyanato dibenzyl, naphthylene-1,5-diisocyanate and diphenylmethane-p,p'-diisocyanate. In each case strand burning rates and physical properties were similar to those disclosed in Example I and were satisfactory.

EXAMPLE VII

The method of this example was the same as Example I, above, except that a burning rate modifier was added to the composition in various amounts. Strand burning tests were then conducted on the composition and the results are shown below:

| NH$_4$ClO$_4$ [1] | Polyesterurethanediol polymer | Burning rate modifier [2] | Strand burning rates, in./sec. at 70° F. | | | | |
|---|---|---|---|---|---|---|---|
| | Percent | | 450 p.s.i.a. | 750 p.s.i.a. | 1,000 p.s.i.a. | 1,500 p.s.i.a. | 2,000 p.s.i.a. |
| 70 | 29 | 1.0 | 0.37 | | | | |
| 75 | 24 | 1.0 | 0.49 | 0.55 | 0.56 | | |
| 80 | 19.5 | 0.5 | 0.53 | 0.67 | 0.70 | | |
| 80 | 19.0 | 1.0 | 0.54 | 0.68 | 0.72 | 0.73 | 0.67 |
| 80 | 18.5 | 1.5 | 0.59 | 0.76 | 0.85 | 0.94 | 0.96 |
| 77.3 | 19.2 | 3.5 | 0.53 | 0.65 | 0.72 | 0.77 | 0.80 |

[1] Dried and ground at 16,000 r.p.m. in a Bantam SH Mikropulverizer with 0.020" screen.
[2] Finely-divided copper hexadecachlorophthalocyanine.

As can be seen from the data in the above table the strand burning rate increases as the NH$_4$ClO$_4$ content is increased in compositions containing 1% of the burning rate modifier. Moreover, as the amount of burning rate modifier is increased some increase in burning rate is obtained. However, what is more important is that the burning rate modifier noted above tends to suppress the normal effect of pressure upon burning rate or provide a "plateau" in the burning rate/pressure curve so that increasing gas pressures do not appreciably increase burning rates which is in unique contrast to other composite gas-generating formulations. Accordingly, since the burning rate tends to remain constant over a useful pressure range the design and control of a device using the composition is facilitated.

EXAMPLE VIII

This example was similar to Example VII, above, except that finely-divided elemental boron 5% by weight on the composition was used in place of copper hexadecachlorophthalocyanine. Improvements in burning rates were realized. In fact, with 5% by weight of finely powdered boron, 70, 72.5 and 75% NH$_4$ClO$_4$ and balance polyesterurethane-diol polymer, sustained strand burning at 1000 p.s.i. was obtained in the first instance and up to 2000 p.s.i. for the higher concentrations of oxidizing agent. This illustrates that with a lower concentration of oxidizing agent, the burning rate modifier will permit sustained burning at higher pressures.

EXAMPLE IX

This example was similar to Example VII, above, except that the composition contained copper chromite and variations were made in the ratio of the polymer to the oxidizing agent as shown below:

| Components | Compositions, percent by weight | | | | |
|---|---|---|---|---|---|
| | A | B | C | D | E |
| Polyesterurethanediol polymer | 23.45 | 23.20 | 19.75 | 19.25 | 19.00 |
| NH$_4$ClO$_4$ | 76.30 | 76.30 | 80.00 | 80.00 | 80.00 |
| Copper chromite | 0.25 | 0.50 | 0.25 | 0.75 | 1.00 |

Specimens were tested and gave the following results:

| Composition | Strand burning rates, 70° F., inches/sec. | | | | | |
|---|---|---|---|---|---|---|
| | 250 p.s.i.a. | 450 p.s.i.a. | 750 p.s.i.a. | 1,000 p.s.i.a. | 1,500 p.s.i.a. | 2,000 p.s.i.a. |
| A | 0.41 | 0.57 | 0.68 | 0.73 | 0.78 | 0.80 |
| B | 0.43 | 0.59 | 0.74 | 0.80 | 0.89 | 0.96 |
| C | 0.47 | 0.63 | 0.78 | 0.86 | 0.95 | 0.98 |
| D | 0.47 | 0.67 | 0.84 | 0.95 | 1.12 | 1.20 |
| E | 0.49 | 0.68 | 0.88 | 0.98 | 1.10 | 1.20 |

| Composition | Instron tests 5"/inch/min., 70° F. | | |
|---|---|---|---|
| | Max. t., p.s.i. | Elong. at max. t., percent | Modulus, p.s.i. |
| A | 1,180 | 10.2 | 31,700 |
| B | 1,060 | 9.8 | 30,800 |
| C | 1,170 | 8.0 | 32,100 |
| D | 1,120 | 4.0 | 28,000 |
| E | 1,190 | 4.0 | 32,000 |

These results, thus, show that copper chromite can be used to enhance the burning rates of the resulting composition while still obtaining satisfactory physical properties.

EXAMPLE X

The method of this example was the same as Example I, above, except that composition was mixed at atmospheric pressure. After cure it was tested and compared to the composition of Example I which had been mixed under a vacuum and the results obtained are shown below:

| Mixing procedure | Specific gravity | Tensile, p.s.i. | Elongation at break, percent | Strand burning rate [1] |
|---|---|---|---|---|
| Air | 1.604 | 546 | 6.7 | 0.30 |
| Vacuum | 1.740 | 721 | 12.2 | 0.32 |

[1] 70° F., in./sec. at 350 p.s.i.a.

It, thus, is apparent that vacuum-mixing produces cured compositions having superior physical properties, probably due to the fact that gas bubbles, which would tend to weaken the final product, are eliminated by vacuum-mixing.

EXAMPLE XI

The method of this example was the same as Example I, above, except that slight variations were made in the oxidizer-binder ratio, the composition contained additionally a burning rate modifier, copper hexadecachlorophthalocyanine, and variations were made in the time of mixing. After cure, the strand burning rates were determined and are shown below:

| NH₄ClO₄ | Percent Polyester-urethanediol polymer | Phthalo green | Batch size, gms. | Mixing time, mins. | Strand burning rate in./sec. at 70° F. 750 p.s.i.a. | 1,000 p.s.i.a |
|---|---|---|---|---|---|---|
| 80.2 | 18.8 | 1.0 | 350 | 25 | 0.52 | 0.53 |
| 80.2 | 18.8 | 1.0 | 350 | 30 | 0.54 | 0.57 |
| 80.2 | 18.8 | 1.0 | 350 | 32 | 0.57 | 0.59 |
| 80.2 | 18.8 | 1.0 | 350 | 35 | 0.60 | 0.63 |
| 80.2 | 18.8 | 1.0 | 350 | 43 | 0.75 | 0.76 |
| 80.2 | 18.8 | 1.0 | 500 | 32 | 0.49 | 0.52 |
| 80.2 | 18.8 | 1.0 | 500 | 46 | 0.59 | 0.61 |
| 80.2 | 18.8 | 1.0 | 500 | 75 | 0.64 | 0.69 |

The above results show that thorough mixing results in better strand burning rates. It, of course, will be appreciated that mixing was done in a Baker-Perkins mixing apparatus and that the time of mixing will vary with the type of apparatus and time required to obtain thorough mixing of dispersion of the components of the composition. Moreover, the results obtained would indicate that some additional size reduction of the NH₄ClO₄ particles is occurring since the increase realized in strand burning rates is more than might be expected as a result of good dispersion.

EXAMPLE XII

The method of this example was the same as Example I, above, except that variations were made in the amount of preground ammonium perchlorate used to granular "as received" ammonium perchlorate used. The composition comprised 80% NH₄ClO₄, 19% polyesterurethanediol polymer and 1% copper hexadecachlorophthalocyanine. After cure, strand burning rates of the cured compositions were determined and are shown below:

| Percent NH₄ClO₄ ground [1] | Strand burning rates at 70° F., in./sec. | | | | |
|---|---|---|---|---|---|
| | 450 p.s.i.a. | 750 p.s.i.a. | 1,000 p.s.i.a. | 1,500 p.s.i.a. | 2,000 p.s.i.a. |
| None | 0.22 | 0.27 | 0.29 | | |
| 25 | 0.32 | | | | |
| 50 | 0.31 | 0.35 | | | |
| 75 | 0.40 | 0.45 | 0.48 | 0.52 | 0.57 |
| 100 | 0.51 | 0.59 | 0.61 | 0.65 | 0.68 |

[1] Percent of total dried NH₄ClO₄ used in batch ground at 16,000 r.p.m. in Bantam SH Mikropulverizer using 0.020" screen; remainder of NH₄ClO₄ dried but not ground.

These results show the desirability of using finely-divided oxidizing agent to achieve higher burning rates.

In summary, the present invention teaches that polyesterurethanes can be highly loaded with finely-divided oxygen-liberating compounds and cured by means of diols and the like at relatively low temperatures to provide compositions which combust rapidly to essentially all gaseous products of low molecular weight. Certain materials added in small amounts as burning rate modifiers result in higher combustion rates. The compositions are strong and impact resistant. The composition of the present invention will have many uses wherever rapid gas generation is required such as for spraying equipment, rivet guns, gas propelled devices, pyrotechnic devices, gas driven motors generally, etc.

What is claimed is:

1. A composition of matter useful in generating large volumes of gas on combustion and comprising essentially at least one solid, inorganic, strong, oxidizing salt and at least one cohesive, plastic, rubbery, combustible polymer of an organic diisocyanate and a hydroxyl terminated polyester of a dibasic acid and a glycol, said salt being present in a major amount sufficient to burn said polymer on ignition and said polymer being present in a minor amount sufficient to bind said composition into a cohesive mass.

2. A composition of matter useful in generating large volumes of gas on combustion and comprising essentially a finely-divided, solid, inorganic, strong, oxidizing salt, a cohesive, plastic, rubbery, combustible polymer of an aromatic diisocyanate and a hydroxyl terminated polyester of an aliphatic dibasic acid and a glycol and cured with a polyfunctional aliphatic hydroxyl curing agent and at least one solid, finely-divided, heat resistant burning rate modifier, said salt being present in a major amount sufficient to burn said polymer and said curing agent to obtain at least gaseous CO and H₂O on combustion, said polymer being present in a minor amount sufficient to bind said composition into a cohesive mass, said curing agent being present in an amount sufficient to cure said uncompounded polymer to a tough, rubbery state and said burning rate modifier being present in a very minor amount sufficient to enhance the linear burning rate of said composition.

3. A composition of matter useful in generating large volumes of gas on combustion and comprising from about 70 to 87% by weight of a ground, dried, solid, inorganic, strong, oxidizing salt, about at least 1% by weight of a solid, finely-divided, heat-resistant linear burning rate modifier selected from the group consisting of copper chromite, zinc chromite, hydrated precipitated calcium silicate, copper hexadecachlorophthalocyanine, red iron oxide and boron and the balance essentially a cohesive, plastic, rubbery, combustible polymer of from about 1.3 to 2.0 mols of a phenylene diisocyanate and about 1 mol of a hydroxyl terminated polyester of an aliphatic dibasic acid and a glycol and cured with from about 0.2 to 0.8 mol of a polyfunctional aliphatic hydroxyl curing agent selected from the group consisting of diols, triols and amine-containing diols and triols.

4. A composition of matter according to claim 3 in which said phenylene diisocyanate is paraphenylene diisocyanate and said polyester is polyethylene adipate.

5. A composition of matter according to claim 3 in which said salt is ammonium perchlorate.

6. A composition of matter according to claim 3 in which said polyfunctional aliphatic hydroxyl curing agent is 1,4-butanediol.

7. A composition of matter according to claim 3 in which said polyfunctional aliphatic hydroxyl curing agent is trimethylol propane.

8. A composition of matter comprising from about 70 to 87% by weight of dried, pulverized ammonium perchlorate, from about 1 to 2% by weight of copper hexadecachlorophthalocyanine as a burning rate modifier and the balance a combustible, cured, plastic, rubbery polyesterurethane formed by the reaction of about 1 mol of polyethylene adipate with from about 1.3 to 2.0 mols of p-phenylene diisocyanate, and cured with from about 0.2 to 0.8 mol of trimethylol propane, the mols of said diisocyanate being greater than the total mols of said adipate and said propane.

9. An article of manufacture useful as a gas generator and comprising a container and adherent to the inside walls of said container a shaped, cured, mixed composition characterized by generating large volumes of gas on combustion and comprising essentially at least one solid, inorganic, strong, oxidizing salt and at least one cohesive, plastic, rubbery combustible polymer of an organic diisocyanate and a hydroxyl terminated polyester of a dibasic acid and a glycol, said salt being present in a major amount sufficient to burn said polymer on combustion and said polymer being present in a minor amount sufficient to bind said composition into a cohesive mass.

10. An article of manufacture useful as a gas generator and comprising a container and adherent to the inside walls of said container, a shaped, cured, mixed composition characterized by generating large volumes of gas on combustion and comprising essentially a solid, inorganic, strong, ground, oxidizing salt, a cohesive, plastic, rubbery, combustible polymer of an aromatic diisocyanate and a hydroxyl terminated polyester of an aliphatic dibasic acid and a glycol and cured with at least one polyfunctional aliphatic hydroxyl curing agent and at least one solid, finely-divided, heat-resistant burning rate modifier, said salt being present in a major amount sufficient to burn said polymer and said curing agent to obtain substantially gaseous CO and $H_2O$ on combustion, said polymer being present in a minor amount sufficient to bind said composition into a cohesive mass, said curing agent being present in an amount sufficient to cure said uncompounded polymer to a tough, rubbery state and said burning rate modifier being present in a very minor amount sufficient to enhance the linear burning rate of said composition.

11. An article of manufacture useful as a gas generator and comprising a container and adherent to the inside walls of said container, a shaped, cured, mixed composition characterized by generating large volumes of gas on combustion and comprising from about 70 to 87% by weight of a ground, dried, solid, inorganic, strong oxidizing salt, about at least 1% by weight of a solid, finely-divided, heat-resistant linear burning rate modifier selected from the group consisting of copper chromite, zinc chromite, hydrated precipitated calcium siliate, copper hexadecachlorophthalocyanine, red iron oxide and boron and the balance essentially a cohesive, plastic, rubbery, combustible polymer of from about 1.3 to 2.0 mols of a phenylene diisocyanate and about 1 mol of a hydroxyl terminated polyester of an aliphatic dibasic acid and a glycol and cured with from about 0.2 to 0.8 mol of a polyfunctional aliphatic hydroxyl curing agent selected from the group consisting of diols, triols and amine-containing diols and triols.

12. An article of manufacture according to claim 11 in which in said composition said phenylene diisocyanate is paraphenylene diisocyanate and said polyester is polyethylene adipate.

13. An article of manufacture according to claim 11 in which in said composition said salt is ammonium perchlorate.

14. An article of manufacture according to claim 11 in which in said composition said polyfunctional aliphatic hydroxyl curing agent is 1,4-butanediol.

15. An article of manufacture according to claim 11 in which in said composition said polyfunctional aliphatic hydroxyl curing agent is trimethylol propane.

16. An article of manufacture comprising a metallic container and adhesively bonded to the inside walls of said container a mixed, shaped and cured composition comprising from about 70 to 87% by weight of dried, pulverized ammonium perchlorate, from about 1 to 2% by weight of copper hexadecachlorophthalocyanine as a burning rate catalyst, and the balance a combustible, cured, tough, rubbery polyesterurethane formed by the reaction of about 1 mol of polyethylene adipate with from about 1.3 to 2.0 mols of p-phenylene diisocyanate and cured with from about 0.2 to 0.8 mol of trimethylol propane, the mols of said diisocyanate being greater than the total mols of said adipate and said propane.

17. The method of making a composition useful in generating large volumes of gas on combustion which comprises mixing together to obtain a thorough dispersion at least one solid, inorganic, strong oxidizing salt and at least one cohesive, plastic, rubbery combustible polymer of an organic diisocyanate and a hydroxyl terminated polyester of a dibasic acid and a glycol, and curing the same, the temperature during mixing and curing being appreciably below the autoignition point of said composition, said salt being present in a major amount sufficient to burn said polymer on combustion and said polymer being present in a minor amount sufficient to bind said composition into a cohesive mass.

18. The method of making a composition useful in generating large volumes of gas on combustion which comprises mixing together to obtain a thorough dispersion a finely-divided solid, inorganic, strong oxidizing salt, a solid, finely-divided, heat-resistant burning rate modifier and a cohesive, plastic, rubbery combustible polymer of an aromatic diisocyanate and a hydroxyl terminated polyester of an aliphatic dibasic acid and a glycol, mixing at least one polyfunctional aliphatic hydroxyl curing agent for said polymer with said dispersion, shaping the resulting dispersion and curing the same, the temperature during mixing, shaping and curing being well below the autoignition point of the composition, said mixing being conducted under a pressure less than atmospheric, said salt being present in a major amount sufficient to burn at least said polymer and said curing agent to substantially gaseous products of low molecular weight, said polymer being present in a minor amount sufficient to bind said composition into a cohesive mass, said curing agent being present in an amount sufficient to cure said uncompounded polymer to a tough, rubbery state, and said burning rate modifier being present in a very minor amount sufficient to enhance the linear burning rate of said composition.

19. The method of making a composition useful in generating large volumes of gas on combustion which comprises mixing together a ground, dried, solid, inorganic, strong oxidizing salt, a solid, finely-divided, heat-resistant linear burning rate modifier selected from the group consisting of copper chromite, zinc chromite, hydrated precipitated calcium silicate, copper hexadecachlorophthalocyanine, red iron oxide and boron, and a cohesive, plastic, rubbery combustible polymer of from about 1.3 to 2.0 mols of a phenylene diisocyanate and about 1.0 mol of a hydroxyl terminated polyester of an aliphatic dibasic acid and a glycol, incorporating in said dispersion from about 0.2 to 0.8 mol of a polyfunctional aliphatic hydroxyl curing agent selected from the group consisting of diols, triols and amine-containing diols and triols, shaping the resulting mixture and curing the same, the temperature during mixing and curing being not over about 170° F., said mixing being conducted under a pressure less than atmospheric, said salt being present in an amount of from about 70 to 87% by weight, said burning rate modifier being present in an amount of about at least 1% by weight and the balance of said composition being essentially said cured polymer.

20. The method according to claim 19 in which said phenylene diisocyanate is paraphenylene diisocyanate and said polyester is polyethylene adipate.

21. The method according to claim 19 in which said salt is ammonium perchlorate.

22. The method according to claim 19 in which said polyfunctional aliphatic hydroxyl curing agent is 1,4-butanediol.

23. The method according to claim 19 in which said polyfunctional aliphatic hydroxyl curing agent is trimethylol propane.

24. The method which comprises reacting polyethylene adipate with p-phenylene diisocyanate at elevated temperatures under a vacuum and then cooling the same to obtain a cooled liquid, dispersing under a vacuum said liquid with a premixed, pulverized mixture of dried ammonium perchlorate and copper hexadecachlorophthalocyanine to obtain a dough, mixing said dough with trimethylol propane under a vacuum, pressing said mixed dough to shape and curing the same, said mixing and curing steps being at temperatures of up to about 100° F. and 170° F., respectively, and said components being present in the following amounts:
  about 70 to 87% by weight of ammonium perchlorate,
  about 1 to 2% by weight of copper hexadecachlorophthalocyanine, and the
  balance the reaction product of about 1 mol of polyethylene adipate, with about 1.3 to 2.0 mols of p-phenylene diisocyanate and cured with from about 0.2 to 0.8 mol of trimethylol propane, the mols of said diisocyanate being greater than the total mols of said adipate and said propane.

References Cited
UNITED STATES PATENTS

| | | | |
|---|---|---|---|
| 2,621,166 | 12/1952 | Schmidt et al. | 260—75 TN |
| 2,625,535 | 1/1953 | Mastin et al. | 260—75 TN |
| 2,741,800 | 4/1956 | Brockway | 260—75TN |

BENJAMIN R. PADGETT, Primary Examiner

U.S. Cl. X.R.

102—100; 149—20